(12) United States Patent
Nakatsutsumi et al.

(10) Patent No.: US 9,929,431 B2
(45) Date of Patent: Mar. 27, 2018

(54) ELECTROLYTE SOLUTION AND BATTERY

(71) Applicant: Panasonic Intellectual Property Management Co., Ltd., Osaka (JP)

(72) Inventors: Takayuki Nakatsutsumi, Osaka (JP);
Mayumi Maenishi, Osaka (JP);
Nobuhiko Hojo, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 177 days.

(21) Appl. No.: 15/158,594

(22) Filed: May 19, 2016

(65) Prior Publication Data
US 2016/0351960 A1 Dec. 1, 2016

(30) Foreign Application Priority Data

May 25, 2015 (JP) .................. 2015-105055

(51) Int. Cl.
| | | |
|---|---|---|
| *H01M 10/05* | (2010.01) | |
| *H01M 10/0525* | (2010.01) | |
| *H01M 10/0567* | (2010.01) | |
| *H01M 10/0569* | (2010.01) | |
| *H01M 4/485* | (2010.01) | |
| *H01M 10/04* | (2006.01) | |

(52) U.S. Cl.
CPC ... *H01M 10/0525* (2013.01); *H01M 10/0567* (2013.01); *H01M 10/0569* (2013.01); *H01M 4/485* (2013.01); *H01M 10/0413* (2013.01); *H01M 10/0436* (2013.01); *H01M 2300/0025* (2013.01); *H01M 2300/0037* (2013.01)

(58) Field of Classification Search
None
See application file for complete search history.

(56) References Cited

U.S. PATENT DOCUMENTS

2017/0301947 A1* 10/2017 Makino .............. H01M 10/056

FOREIGN PATENT DOCUMENTS

| CN | 106207263 A | * 12/2016 | ........ H01M 10/0525 |
|---|---|---|---|
| JP | 2004-303437 | 10/2004 | |

* cited by examiner

*Primary Examiner* — Scott J Chmielecki
(74) *Attorney, Agent, or Firm* — McDermott Will & Emery LLP

(57) ABSTRACT

An electrolyte solution contains a non-aqueous solvent and an alkali metal salt dissolved in the non-aqueous solvent. The non-aqueous solvent contains cyclopropanecarbonitrile. A battery includes an electrolyte solution which contains a non-aqueous solvent containing cyclopropanecarbonitrile and an alkali metal salt dissolved in the non-aqueous solvent, a positive electrode containing a positive electrode active material that has a property of occluding and releasing an alkali metal ion, and a negative electrode containing an alkali metal or a negative electrode active material that has a property of occluding and releasing the alkali metal ion.

11 Claims, 3 Drawing Sheets

ELECTROLYTE SOLUTION AND BATTERY

BACKGROUND

1. Technical Field

The present disclosure relates to an electrolyte solution for batteries and a battery.

2. Description of the Related Art

Japanese Unexamined Patent Application Publication No. 2004-303437 discloses a non-aqueous electrolyte secondary battery including a non-aqueous electrolyte solution containing a non-aqueous solvent containing a nitrile compound.

SUMMARY

Conventional techniques are required to provide batteries having high input-output characteristics and high reliability.

In one general aspect, the techniques disclosed here feature an electrolyte solution containing a non-aqueous solvent and an alkali metal salt dissolved in the non-aqueous solvent. The non-aqueous solvent contains cyclopropanecarbonitrile. In one general aspect, the techniques disclosed here feature a battery including the above-mentioned electrolyte solution, a positive electrode containing a positive electrode active material that has a property of occluding and releasing an alkali metal ion, and a negative electrode containing an alkali metal or a negative electrode active material that has a property of occluding and releasing the alkali metal ion.

According to the present disclosure, a battery having high input-output characteristics and high reliability can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
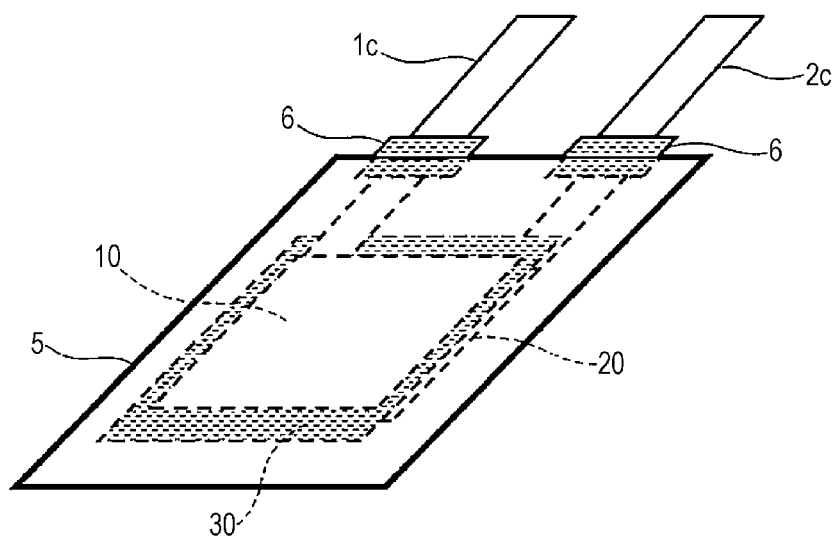
FIG. 1 is a schematic perspective view of an example of a battery according to a second embodiment.

Embodiments of the present disclosure are described below.

First, a viewpoint of the inventor is described below.

A carbonate solvent used in conventional techniques undergoes one-electron reduction on a negative electrode and therefore is degraded. In this reaction, a degradation product of the carbonate solvent forms a passive film called a solid electrolyte interface (SEI). This suppresses the continuous oxidative degradation of the carbonate solvent. Therefore, non-aqueous electrolyte solutions containing the carbonate solvent have high reliability. However, there is a problem in that electrolyte solutions containing the carbonate solvent have low ionic conductivity.

A nitrile solvent used in conventional techniques has low SEI-forming ability. Therefore, the nitrile solvent is continuously degraded on a negative electrode. Thus, there is a problem in that discharge efficiency after several charge/discharge cycles are repeated is low.

The inventor has created a configuration according to the present disclosure on the basis of the above viewpoint.

First Embodiment

An electrolyte solution according to a first embodiment contains a non-aqueous solvent and an alkali metal salt dissolved in the non-aqueous solvent.

The non-aqueous solvent contains cyclopropanecarbonitrile.

According to the above configuration, the electrolyte solution has high ionic conductivity and high reliability. This allows a battery having high input-output characteristics and high reliability to be achieved.

In general, nitrile groups have high polarity. Therefore, the nitrile groups have high coordination ability to alkali metal ions such as a lithium ion. Therefore, nitrile compounds have the high ability to dissolve alkali metal salts such as lithium salts.

Cyclopropanecarbonitrile has lower viscosity as compared to carbonate solvents. This allows ions to quickly move in a solvent containing cyclopropanecarbonitrile. Using the electrolyte solution, which has high ionic conductivity, allows a battery to have increased input-output characteristics.

The above factor probably leads to an increase in ionic conductivity.

In a nitrile solvent such as propionitrile, a portion of a nitrile group undergoes one-electron reduction on a negative electrode during charge and therefore molecular fragmentation probably occurs as expressed by Formula (1) below. A product of this reaction has low molecular weight and is likely to be dissolved in solvents. Therefore, the reduction reaction probably occurs continuously.

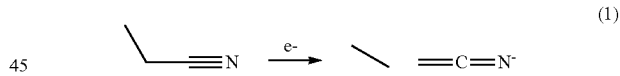

(1)

On the other hand, in the case of cyclopropanecarbonitrile, a portion of a nitrile group undergoes reductive degradation and therefore molecular ring-opening probably occurs as expressed by Formula (2) below.

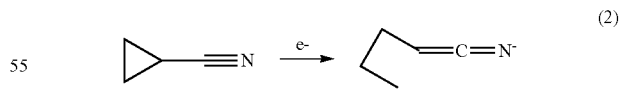

(2)

Unlike the fragmentation reaction expressed by Formula (1), such a ring-opening reaction causes no reduction in molecular weight. Therefore, high-molecular weight compounds insoluble in solvents are likely to be produced. The high-molecular weight compounds are probably deposited on the negative electrode in the form of an SEI. Therefore, a continuous reductive degradation reaction on the negative electrode is suppressed.

The above factor probably leads to an increase in reliability.

The non-aqueous solvent may contain a non-aqueous compound in addition to cyclopropanecarbonitrile.

The non-aqueous compound used may be a known solvent for non-aqueous electrolytes. In particular, the non-aqueous compound used may be a cyclic carbonate, a linear carbonate, a cyclic carboxylate, a linear carboxylate, a linear nitrile, a cyclic ether, a linear ether, or the like.

When the non-aqueous solvent contains the cyclic carbonate, the solubility of a Li salt can be increased. The cyclic carbonate used may be ethylene carbonate, fluoroethylene carbonate, propylene carbonate, butylene carbonate, vinylene carbonate, vinylethylene carbonate, and derivatives thereof. These carbonates may be used alone or in combination. In the case of using at least one selected from the group consisting of ethylene carbonate, fluoroethylene carbonate, and propylene carbonate, the ionic conductivity of the electrolyte solution can be increased. In the case of using fluoroethylene carbonate, the stability of the electrolyte solution on the negative electrode can be increased.

In the electrolyte solution, the non-aqueous solvent may contain fluoroethylene carbonate.

According to the above configuration, the ionic conductivity of the electrolyte solution can be increased. The stability of the electrolyte solution on the negative electrode can be increased.

The linear carbonate used may be dimethyl carbonate, ethyl methyl carbonate, diethyl carbonate, and derivatives thereof. These derivatives used may be fluorinated products prepared by substituting a hydrogen atom of each of these carbonates by a fluoro group. In the case of using the fluorinated products, the stability of the electrolyte solution on a positive electrode can be increased. These carbonates and derivatives may be used alone or in combination.

The cyclic carboxylate used may be γ-butyrolactone, γ-valerolactone, and derivatives thereof. These derivatives used may be compounds prepared by substituting a hydrogen atom of each of these lactones by a fluoro group. In the case of using the compounds, the oxidation resistance of the electrolyte solution can be increased. These lactones and derivatives may be used alone or in combination.

Examples of the linear carboxylate include methyl acetate, ethyl acetate, propyl acetate, methyl propionate, ethyl propionate, propyl propionate, and derivatives thereof. These derivatives used may be compounds prepared by substituting a hydrogen atom of each of these carboxylates by a fluoro group. In the case of using these compounds, the oxidation resistance of the electrolyte solution can be increased. These carboxylates and derivatives may be used alone or in combination.

The linear nitrile used may be acetonitrile, propionitrile, butyronitrile, valeronitrile, isobutyronitrile, pivalonitrile, adiponitrile, pimelonitrile, and derivatives thereof. These derivatives used may be compounds prepared by substituting a hydrogen atom of each of these nitriles by a fluoro group. In the case of using these compounds, the oxidation resistance of the electrolyte solution can be increased. These nitriles and derivatives may be used alone or in combination.

The cyclic ether used may be 1,3-dioxolane, 1,4-dioxolane, tetrahydrofuran, 2-methyltetrahydrofuran, and derivatives thereof. These derivatives used may be compounds prepared by substituting a hydrogen atom of each of these ethers by a fluoro group. In the case of using these compounds, the oxidation resistance of the electrolyte solution can be increased. These ethers and derivatives may be used alone or in combination.

The linear ether used may be 1,2-dimethoxyethane, dimethyl ether, diethyl ether, dipropyl ether, ethyl methyl ether, diethylene glycol dimethyl ether, diethylene glycol diethyl ether, diethylene glycol dibutyl ether, and derivatives thereof. These derivatives used may be compounds prepared by substituting a hydrogen atom of each of these ethers by a fluoro group. In the case of using these compounds, the oxidation resistance of the electrolyte solution can be increased. These ethers and derivatives may be used alone or in combination.

The alkali metal salt, which is dissolved in the non-aqueous solvent, may be a lithium salt, a sodium salt, or the like.

The lithium salt used may be $LiClO_4$, $LiBF_4$, $LiPF_6$, $LiN(SO_2F)_2$, $LiN(SO_2CF_3)_2$, lithium bis(oxalato)borate (LiBOB), or the like.

The sodium salt used may be $NaClO_4$, $NaBF_4$, $NaPF_6$, $NaN(SO_2F)_2$, $NaN(SO_2CF_3)_2$, or the like.

In the electrolyte solution, the alkali metal salt may be the lithium salt.

The lithium salt may be at least one selected from the group consisting of $LiBF_4$, $LiPF_6$, $LiN(SO_2CF_3)_2$, and $LiN(SO_2F)_2$.

According to the above configuration, the ionic conductivity of the electrolyte solution can be increased.

The molar content of the alkali metal salt in the electrolyte solution may be, for example, 0.5 mol/L to 2.0 mol/L.

In the electrolyte solution, the proportion of the volume of cyclopropanecarbonitrile to the volume of the non-aqueous solvent may be 1% by volume or more.

According to the above configuration, a battery having high input-output characteristics and high reliability can be achieved.

In the electrolyte solution, the proportion of the volume of cyclopropanecarbonitrile to the volume of the non-aqueous solvent may be 50% by volume or more.

According to the above configuration, a battery having high input-output characteristics and higher reliability can be achieved.

In the electrolyte solution, the proportion of the volume of cyclopropanecarbonitrile to the volume of the non-aqueous solvent may be 80% by volume or more.

According to the above configuration, a battery having high input-output characteristics and higher reliability can be achieved.

Second Embodiment

A second embodiment is described below. Descriptions common to the first embodiment will be appropriately omitted.

A battery according to the second embodiment includes the electrolyte solution according to the first embodiment, a positive electrode, and a negative electrode.

The positive electrode contains a positive electrode active material that has a property of occluding (i.e. capable of storing and releasing) one or more alkali metal ions.

The negative electrode contains an alkali metal or a negative electrode active material that has a property of occluding (i.e. capable of storing and releasing) the one or more alkali metal ions.

According to the above configuration, for example, a battery having high input-output characteristics and high reliability can be achieved.

The battery according to the second embodiment may be configured as, for example, a secondary battery.

In the battery according to the second embodiment, the negative electrode may contain the alkali metal. The alkali metal may be lithium.

According to the above configuration, a battery with enhanced battery characteristics such as energy density or reliability can be achieved.

In the battery according to the second embodiment, the negative electrode may contain the negative electrode active material. The negative electrode active material may be carbon.

According to the above configuration, a battery with enhanced battery characteristics such as energy density or reliability can be achieved.

In the battery according to the second embodiment, the positive electrode active material may be a metal oxide containing lithium and at least one selected from the group consisting of nickel, cobalt, and manganese.

According to the above configuration, a battery with enhanced battery characteristics such as energy density or reliability can be achieved.

FIG. 1 is a schematic perspective view of an example of the battery according to the second embodiment.

Figure 2:
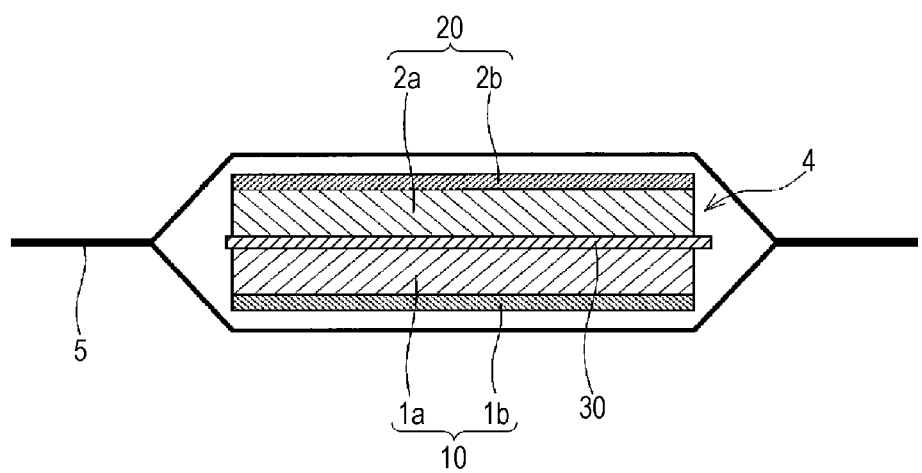
FIG. 2 is a schematic sectional view of an example of the battery according to the second embodiment.

FIG. 2 is a schematic sectional view of an example of the battery according to the second embodiment.

As shown in FIGS. 1 and 2, the battery according to the second embodiment includes an electrode group 4 and an enclosure 5.

The electrode group 4 is housed in the enclosure 5.

The electrode group 4 includes a positive electrode 10, a negative electrode 20, and a separator 30.

The positive electrode 10 is composed of a positive electrode current collector 1b and a positive electrode mix layer 1a.

The positive electrode mix layer 1a is placed on the positive electrode current collector 1b.

The negative electrode 20 is composed of a negative electrode current collector 2b and a negative electrode mix layer 2a.

The negative electrode mix layer 2a is placed on the negative electrode current collector 2b.

The positive electrode 10 and the negative electrode 20 face each other with the separator 30 therebetween. This forms the electrode group 4.

The electrode group 4 is impregnated with the electrolyte solution according to the first embodiment.

The positive electrode current collector 1b is connected to a positive electrode tab lead 1c.

The negative electrode current collector 2b is connected to a negative electrode tab lead 2c.

The positive electrode tab lead 1c and the negative electrode tab lead 2c extend out of the enclosure 5.

An insulating tab film 6 is placed between the positive electrode tab lead 1c and the enclosure 5.

Another insulating tab film 6 is placed between the negative electrode tab lead 2c and the enclosure 5.

The positive electrode mix layer 1a contains the positive electrode active material, which is capable of storing and releasing the alkali metal ions.

The positive electrode active material is a material capable of storing and releasing one or more of the alkali metal ions. The positive electrode active material used may be, for example, an alkali metal-containing transition metal oxide, an alkali metal-containing transition metal fluoride, an alkali metal-containing polyanionic material, an alkali metal-containing fluorinated polyanionic material, an alkali metal-containing transition metal sulfide, or the like. The positive electrode active material used may be, for example, lithium-containing transition metal oxides such as $Li_xMe_yO_2$ and $Li_{1+x}Ne_yO_3$, where $0<x\leq1$, $0.95\leq y<1.05$, and Me includes at least one selected from the group consisting of Co, Ni, Mn, Fe, Cr, Cu, Mo, Ti, and Sn. Alternatively, the positive electrode active material used may be lithium-containing polyanionic materials such as $Li_xMe_yPO_4$ and $Li_xMe_yP_2O_7$, where $0<x\leq1$, $0.95\leq y<1.05$, and Me includes at least one selected from the group consisting of Co, Ni, Mn, Fe, Cu, and Mo. The positive electrode active material used may be a sodium-containing transition metal oxide such as $Na_xMe_yO_2$, where $0<x\leq1$, $0.95\leq y<1.05$, and Me includes at least one selected from the group consisting of Co, Ni, Mn, Fe, Cr, Cu, Mo, Ti, and Sn.

The positive electrode current collector 1b used may be a porous or poreless sheet or porous or poreless film made of a metal material such as aluminium, an aluminium alloy, stainless steel, titanium, or a titanium alloy. When the positive electrode current collector 1b is made of aluminium or an alloy thereof, the positive electrode current collector 1b is inexpensive and is readily obtained in the form of a thin film. Such a sheet or film used may be metal foil, metal mesh, or the like. The positive electrode current collector 1b may be surface-coated with a carbon material such as carbon for the purpose of reducing the resistance, the purpose of imparting catalysis, or the purpose of strengthening the bond between the positive electrode mix layer 1a and the positive electrode current collector 1b.

The negative electrode mix layer 2a contains the negative electrode active material, which is capable of storing and releasing the alkali metal ions.

The negative electrode active material used may be the alkali metal or a material capable of storing and releasing the alkali metal ions. The material capable of storing and releasing the alkali metal ions may be an alkali metal alloy, carbon, a transition metal oxide, a silicon material, or the like. For example, a negative electrode material for lithium secondary batteries may be an alloy of lithium and at least one selected from the group consisting of Zn, Al, Sn, Si, Pb, Na, Ca, In, and Mg; a carbon material such as synthetic graphite, natural graphite, non-graphitizable amorphous carbon, or graphitizable amorphous carbon; a transition metal oxide such as $Li_4Ti_5O_{12}$, $TiO_2$, or $V_2O_5$; $SiO_x$, where $0<x\leq2$; metallic lithium; or the like. For example, a negative electrode material for sodium secondary batteries may be an alloy of sodium and at least one selected from the group consisting of Zn, Al, Sn, Si, Pb, Na, Ca, In, and Mg; a carbon material such as non-graphitizable amorphous carbon or graphitizable amorphous carbon; a transition metal oxide such as $Na_2Ti_3O_7$ or $Na_2Ti_6O_{13}$; metallic sodium; or the like.

The negative electrode current collector 2b used may be a porous or poreless sheet or porous or poreless film made of a metal material such as aluminium, an aluminium alloy, stainless steel, nickel, a nickel alloy, copper, or a copper alloy. When the negative electrode current collector 2b is made of aluminium or an alloy thereof, the negative electrode current collector 2b is inexpensive and is readily obtained in the form of a thin film. Such a sheet or film used may be metal foil, metal mesh, or the like. The negative electrode current collector 2b may be surface-coated with a carbon material such as carbon for the purpose of reducing the resistance, the purpose of imparting catalysis, or the purpose of strengthening the bond between the negative electrode mix layer 2a and the negative electrode current collector 2b.

The separator 30 used may be a porous film made of polyethylene, polypropylene, glass, cellulose, ceramic, or the like. For example, pores in the separator 30 are impregnated with the electrolyte solution.

The positive electrode mix layer 1a and the negative electrode mix layer 2a may contain a conductive aid, an ionic conductor, or a binder.

The conductive aid used may be a carbon material such as carbon black, graphite, or acetylene black; a conductive polymer such as polyaniline, polypyrrole, or polythiophene; or the like.

The ionic conductor used may be a gel electrolyte such as polymethyl methacrylate, a solid electrolyte such as polyethylene oxide, or the like.

The binder used may be polyvinylidene fluoride, a vinylidene fluoride-hexafluoropropylene copolymer, a vinylidene fluoride-tetrafluoroethylene copolymer, polytetrafluoroethylene, carboxymethylcellulose, polyacrylic acid, styrene-butadiene copolymer rubber, polypropylene, polyethylene, polyimide, or the like.

Each of the conductive aid, ionic conductor, and binder used may be a generally known material.

The shape of the battery according to the second embodiment may be a sheet shape, a coin shape, a button shape, a stack shape, a cylindrical shape, a flat shape, a rectangular shape, or the like.

EXAMPLES

Examples of the present disclosure are described below. The present disclosure is not limited to the examples below.

Example 1

Preparation of Non-Aqueous Electrolyte Solution

In a solvent mixture of fluoroethylene carbonate (CAS No. 114435-02-8) and cyclopropanecarbonitrile (CAS No. 5500-21-0) mixed at a volume ratio of 1:4, 1.0 mol/L of $LiPF_6$ (CAS No. 21324-40-3) was dissolved, whereby a non-aqueous electrolyte solution was prepared.

Measurement of Ionic Conductivity

The ionic conductivity of the non-aqueous electrolyte solution was measured in a 25° C. thermostatic chamber using a conductivity meter, CM-30R, available from DKK-TOA Corporation. The result is shown in the table.

Preparation of Positive Electrode Plate

A prepared positive electrode active material was $Li(Ni, Co, Al)O_2$. With 100 parts by weight of the positive electrode active material, 5 parts by weight of acetylene black serving as a conductive agent and 5 parts by weight of a polyvinylidene fluoride resin serving as a binder were mixed. The mixture was dispersed in dehydrated N-methyl-2-pyrrolidone, whereby a slurry-like positive electrode mix was prepared. The positive electrode mix was applied to a surface of a positive electrode current collector made of aluminium foil with a thickness of 15 μm. The resulting positive electrode current collector was dried and was then rolled, whereby a positive electrode plate was obtained. The quantity of application of the dry positive electrode mix was 10 mg/cm$^2$.

Preparation of Negative Electrode Plate

The following materials were mixed together: 98 parts by weight of a synthetic graphite powder, 1 part by weight of styrene-butadiene rubber, and 1 part by weight of carboxymethylcellulose. The mixture was dispersed in water, whereby a slurry-like negative electrode mix was prepared. The negative electrode mix was applied to a surface of a negative electrode current collector made of copper foil with a thickness of 10 μm. The resulting negative electrode current collector was dried and was then rolled, whereby a negative electrode plate was obtained. The quantity of application of the dry negative electrode mix was 6.5 mg/cm$^2$.

Preparation of Sheet Battery

Figure 3:
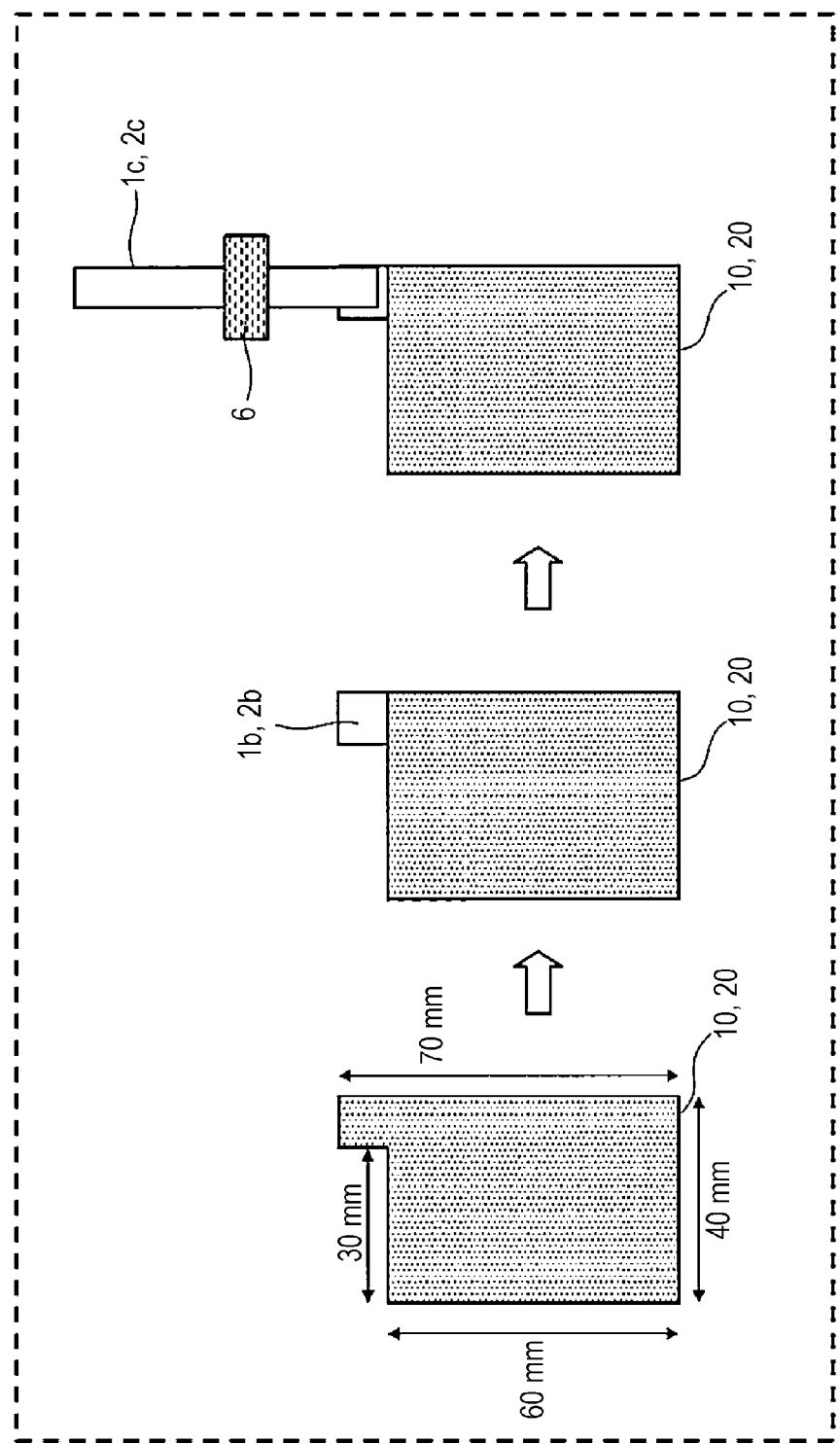
FIG. 3 is a schematic view of the configuration of an electrode plate used in Example 1.

FIG. 3 is a schematic view of the configuration of an electrode plate used in Example 1.

Figure 4:
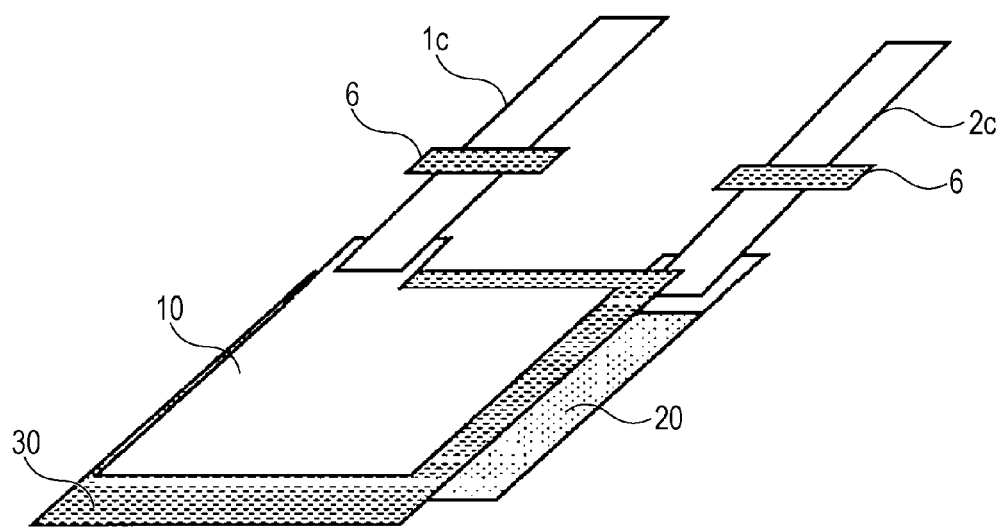
FIG. 4 is a schematic perspective view of the configuration of a battery prepared in Example 1.

FIG. 4 is a schematic perspective view of the configuration of a battery prepared in Example 1.

The positive electrode plate and negative electrode plate were worked so as to have the configuration shown in FIG. 3. The area of each of a positive electrode and a negative electrode was 24 cm$^2$. A positive electrode tab lead used was made of aluminium. A negative electrode tab lead used was made of nickel. The positive electrode and negative electrode tab leads had a heat welding resin heat-welded thereto. As shown in FIG. 4, the positive electrode plate and the negative electrode plate were arranged to face each other with a separator therebetween, the separator being made of polypropylene and having a thickness of 30 μm, such that the positive electrode and the negative electrode overlapped each other, whereby an electrode group was prepared.

Next, a 120 mm square aluminium laminate with a thickness of 100 μm was folded. A 120 mm long end surface of the folded aluminium laminate was heat-sealed at 230° C. The aluminium laminate was shaped into a cylinder with a size of 120 mm×60 mm. The electrode group prepared as shown in FIG. 4 was put in the aluminium laminate through a 60 mm long end surface thereof. An end surface of the aluminium laminate was aligned with the heat welding resin of each tab lead and was heat-sealed at 230° C.

Next, 0.8 cc of the non-aqueous electrolyte solution was poured into the aluminium laminate from an unsealed side thereof. Thereafter, the aluminium laminate was left stationary for 15 minutes in a vacuum of 0.06 MPa, whereby the positive and negative electrode mixes were impregnated with the non-aqueous electrolyte solution.

Finally, the unsealed side of the aluminium laminate was heat-sealed at 230° C., whereby a battery was prepared.

Evaluation of Battery

The battery, which was prepared as described above, was evaluated in accordance with a procedure below.

During evaluation, the battery was pressed at 0.2 MPa using a C-shaped clamp in such a manner that the electrode group was interposed between 80 cm square stainless steel sheets with a thickness of 2 mm through the aluminium laminate.

The battery was evaluated in the 25° C. thermostatic chamber.

The positive electrode and negative electrode mixes were completely impregnated with the non-aqueous electrolyte solution. The battery was repeatedly charged and discharged at a constant current of 1 mA for three cycles for the purpose of forming an SEI on the negative electrode. The charge of the battery was terminated at a voltage of 4.2 V. The discharge of the battery was terminated at a voltage of 2.5 V. The battery was left in an open circuit for 20 minutes during a period between charge and discharge.

Next, the battery was charged and discharged under the same conditions as above for one cycle. The discharge efficiency of the fourth cycle was used as an indicator for reliability. The result is shown in the table.

Example 2

A solvent mixture of fluoroethylene carbonate, acetonitrile (CAS No. 75-05-8), and cyclopropanecarbonitrile mixed at a volume ratio of 20:79:1 was used to prepare an electrolyte solution.

A battery was prepared in substantially the same manner as that described in Example 1 except that the solvent mixture was used. Thereafter, the battery was evaluated in the same manner as that described in Example 1. The ionic conductivity of the battery was measured in the same manner as that described in Example 1. The results are shown in the table.

Comparative Example 1

A solvent mixture of fluoroethylene carbonate and acetonitrile (CAS No. 75-05-8) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The ionic conductivity of the battery was measured in the same manner as that described in Example 1. The results are shown in the table.

Comparative Example 2

A solvent mixture of fluoroethylene carbonate and propionitrile (CAS No. 107-12-0) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The ionic conductivity of the battery was measured in the same manner as that described in Example 1. The results are shown in the table.

Comparative Example 3

A solvent mixture of fluoroethylene carbonate and dimethyl carbonate (CAS No. 616-38-6) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The ionic conductivity of the battery was measured in the same manner as that described in Example 1. The results are shown in the table.

Comparative Example 4

A solvent mixture of fluoroethylene carbonate and ethyl methyl carbonate (CAS No. 623-53-0) mixed at a volume ratio of 1:4 was used to prepare an electrolyte solution.

A battery was prepared in substantially the same manner as that described in Example 1 except that the solvent mixture was used. Thereafter, the battery was evaluated in the same manner as that described in Example 1. The ionic conductivity of the battery was measured in the same manner as that described in Example 1. The results are shown in the table.

TABLE

|  | Solvents | Ionic conductivity [mS/cm] | Discharge efficiency (4th) |
| --- | --- | --- | --- |
| Example 1 | Fluoroethylene carbonate and cyclopropanecarbonitrile | 16.5 | 99.4% |
| Example 2 | Fluoroethylene carbonate, acetonitrile, and cyclopropanecarbonitrile | 35.7 | 98.9% |
| Comparative Example 1 | Fluoroethylene carbonate and acetonitrile | 35.9 | 98.8% |
| Comparative Example 2 | Fluoroethylene carbonate and propionitrile | 23.0 | 98.8% |
| Comparative Example 3 | Fluoroethylene carbonate and dimethyl carbonate | 10.2 | 99.4% |
| Comparative Example 4 | Fluoroethylene carbonate and ethyl methyl carbonate | 8.4 | 99.3% |

As is clear from the results of Examples 1 and 2 and Comparative Examples 1 and 2, the non-aqueous electrolyte solutions containing cyclopropanecarbonitrile exhibit higher reliability as compared to the non-aqueous electrolyte solutions containing acetonitrile or propionitrile.

As is clear from the results of Example 1 and Comparative Examples 3 and 4, the non-aqueous electrolyte solution containing cyclopropanecarbonitrile exhibits reliability equivalent to that of the non-aqueous electrolyte solutions in which the carbonate solvents are main solvents and also exhibits ionic conductivity higher than that of the non-aqueous electrolyte solutions in which the carbonate solvents are main solvents. Therefore, a non-aqueous electrolyte secondary battery including a non-aqueous electrolyte solution containing cyclopropanecarbonitrile exhibits higher input-output characteristics as compared to a non-aqueous electrolyte secondary battery including a non-aqueous electrolyte solution in which the carbonate solvents are main solvents.

As is clear from the results of Example 2 and Comparative Example 1, reliability can be increased by the presence of a small amount of cyclopropanecarbonitrile.

An electrolyte solution according to the present disclosure can be used as an electrolyte solution for batteries.

What is claimed is:

1. An electrolyte solution comprising:
   a non-aqueous solvent; and
   an alkali metal salt dissolved in the non-aqueous solvent,
   wherein the non-aqueous solvent contains cyclopropanecarbonitrile.

2. The electrolyte solution according to claim 1, wherein the proportion of the volume of the cyclopropanecarbonitrile to the volume of the non-aqueous solvent is 1% by volume or more.

3. The electrolyte solution according to claim 2, wherein the proportion of the volume of the cyclopropanecarbonitrile to the volume of the non-aqueous solvent is 50% by volume or more.

4. The electrolyte solution according to claim 3, wherein the proportion of the volume of the cyclopropanecarbonitrile to the volume of the non-aqueous solvent is 80% by volume or more.

5. The electrolyte solution according to claim 1, wherein the non-aqueous solvent contains fluoroethylene carbonate.

6. The electrolyte solution according to claim 1, wherein the alkali metal salt is a lithium salt.

7. The electrolyte solution according to claim 6, wherein the lithium salt is at least one selected from the group consisting of $LiBF_4$, $LiPF_6$, $LiN(SO_2CF_3)_2$, and $LiN(SO_2F)_2$.

8. A battery comprising:
an electrolyte solution;
a positive electrode containing a positive electrode active material that has a property of occluding and releasing an alkali metal ion; and
a negative electrode containing an alkali metal or a negative electrode active material that has a property of occluding and releasing the alkali metal ion,
wherein the electrolyte solution contains a non-aqueous solvent and an alkali metal salt dissolved in the non-aqueous solvent and the non-aqueous solvent contains cyclopropanecarbonitrile.

9. The battery according to claim 8, wherein the negative electrode contains the alkali metal and the alkali metal is lithium.

10. The battery according to claim 8, wherein the negative electrode contains the negative electrode active material and the negative electrode active material is carbon.

11. The battery according to claim 8, wherein the positive electrode active material is a metal oxide containing lithium and at least one selected from the group consisting of nickel, cobalt, and manganese.

* * * * *